M. C. FREY.
TRANSPARENT MIRROR.
APPLICATION FILED APR. 6, 1915.
1,199,882.
Patented Oct. 3, 1916.
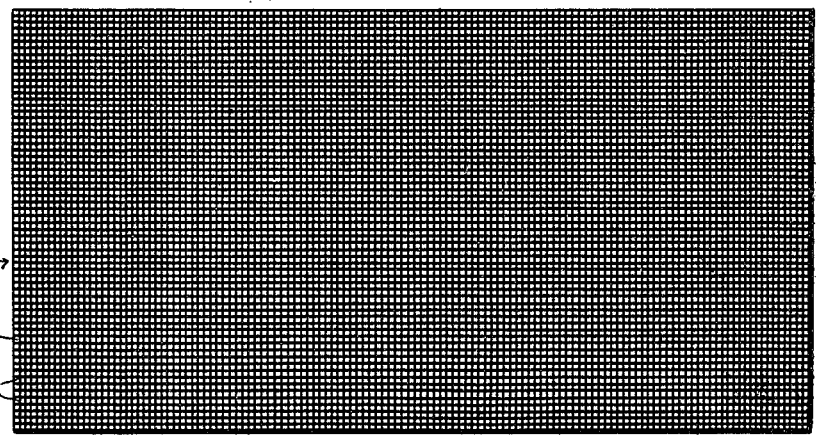
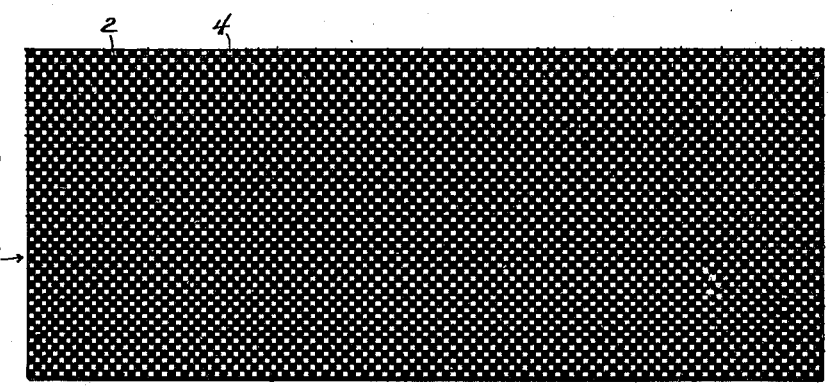
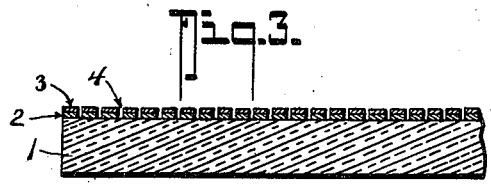
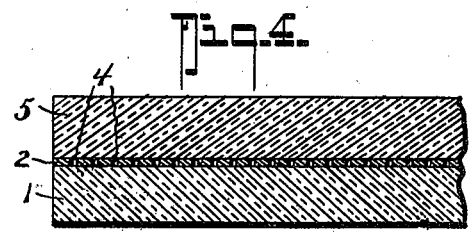
INVENTOR
Martin C. Frey
BY
Fred G Dieterich Co
ATTORNEYS.

UNITED STATES PATENT OFFICE.

MARTIN C. FREY, OF WILKES-BARRE, PENNSYLVANIA.

TRANSPARENT MIRROR.

1,199,882.   Specification of Letters Patent.   Patented Oct. 3, 1916.

Application filed April 6, 1915. Serial No. 19,547.

*To all whom it may concern:*

Be it known that I, MARTIN C. FREY, residing at Wilkes-Barre, county of Luzerne, and State of Pennsylvania, have invented certain new and useful Improvements in Transparent Mirrors, of which the following is a specification.

My invention has for its object to provide a mirror composed of the usual transparent glass body covered on one side with a silvering substance of the usual kind, the silvering substance being backed with the usual varnish, if desired, the silvering being partly removed (in any desired way) or omitted in such manner that the mirror will effectively function as a reflecting medium and yet transmit light through the glass body, whereby objects to the rear of the mirror may be clearly seen in a stronger light than the light in front of the mirror, making the invention particularly adaptable for the back-ground of show windows, enabling daylight to pass through to light up the interior of the store without detracting from the reflecting purposes of the mirror when viewed from the outside in day and enabling the interior of the store to be visible from the outside through the mirror at night when the inside of the store is lighted by artificial means.

In carrying out the invention, I take a glass plate and cover one side with the usual silvering and backing; and then by graving, etching or in any other suitable way, remove a part of the silvering, preferably in a series of close parallel lines, either running in one direction or crossed in the form of a screen or the silvering may be removed by a series of dots resembling those formed by a "half tone" screen, except that the dots should be rectangular instead of round to give the best results and that the aggregate silvered area shall exceed the aggregate removed or transparent area.

In the drawing, I have indicated the preferred forms of the invention and by reference to the drawing, it will be observed that—

Figure 1 is a face view of the mirror showing the preferred form of the invention. Fig. 2 is a view similar to Fig. 1 showing what I term the "half tone" form. Fig. 3 is a detail section on an enlarged scale of the form shown in Fig. 1. Fig. 4 is a view similar to Fig. 3 of a modification hereinafter specifically referred to.

In the drawing, 1 designates the glass plate of the mirror which may be of any size and form suitable to the uses to which it is to be put and 2 represents the usual silvering that is usually provided with a varnish backing 3 or some other suitable protecting medium for the silvering.

In carrying out my invention, a portion of the silvering 2 and backing 3 are removed in a series of parallel lines 4 that may extend in one direction only, or crisscrossed, as shown in Fig. 1, in the form of a screen, the latter form being the preferred form, as demonstrated from practical tests. The removed portion of the silvering may be accomplished by graving or etching or the silvering may be deposited in the form of blocks spaced apart to leave the spaces equivalent to the lines designated by 4 in Fig. 1 and spaces designated by 4 in Fig. 3, the manner of effecting the removal not being, *per se*, an essential part of the invention.

Instead of removing the silvering by lines in the form of a screen, as shown in Fig. 1, the silvering may be omitted or removed in the form of square dots indicated by the reference character 4 in Fig. 2 in somewhat the form of the well known "half tone" screen, except that the dots are of rectangular cross section instead of round to produce the best results. In Fig. 1, the blank lines indicate the portion of the silvering removed and that portion which will transmit light, while in Fig. 2, the white dots indicate the transparent part and the black dots the silvering. The silvered area, in order to obtain the best results, should be in excess of the transparent area.

Instead of employing the varnish backing 3 for the silvering surface, when it is desired to provide a duplex mirror, that is,— one which will reflect on either side and yet transmit light, the silvering 2 may be located between two glass plates 1 and 5, as shown in Fig. 4, a suitable part of the silvering being removed in the manner hereinbefore referred to and as indicated by the numeral 4 in Fig. 4.

The invention is particularly adapted for use, as before stated, as a back-ground or backing for show windows where it is designed to reflect the contents of the show window and give it the appearance of a larger chamber than its real dimensions. When used as such, the mirror side will, of course, be exposed to view from the exterior of the window and in day-time the passersby will not be able to view the interior of the store but at night time when the store is lighted up inside and the window is darkened the window becomes transparent and the interior of the store may be viewed through the same from the outside and passersby thus given a view of the interior of the store.

Numerous other uses for the invention will be apparent, and I do not desire to limit myself in the uses to which this mirror can be put.

While I have spoken of the reflecting surface of the mirror as a silvering, I desire it understood that I do not use this term in the limited sense to refer to any particular composition, as those compositions ordinarily used for the purpose may be employed.

What I claim is:

1. A mirror comprising a transparent body and a silvering on one face of the same, portions of said silvering being removed in clearly defined areas, the aggregate area of the silvering being in excess of the aggregate area of the transparent areas.

2. As a new article of manufacture, a mirror comprising a transparent body and silvering on the face of the same, portions of said silvering being removed and in clearly defined regular criss-cross lines, whereby said mirror will have the appearance of a close mesh fine wire screen, the light reflecting areas being in excess of the light transmitting areas substantially as shown and for the purpose described.

MARTIN C. FREY.